United States Patent
Gerlach

(10) Patent No.: US 11,555,540 B2
(45) Date of Patent: Jan. 17, 2023

(54) METHOD FOR THE ASSEMBLY OF OR FOR PREPARING TO ASSEMBLE A TRACTION DRIVE MODULE AND A TRACTION DRIVE MODULE

(71) Applicant: BorgWarner Inc., Auburn Hills, MI (US)

(72) Inventor: Martin Gerlach, Neulussheim (DE)

(73) Assignee: BORGWARNER INC., Auburn Hills, MI (US)

( * ) Notice: Subject to any disclaimer, the term of this patent is extended or adjusted under 35 U.S.C. 154(b) by 1001 days.

(21) Appl. No.: 16/282,427

(22) Filed: Feb. 22, 2019

(65) Prior Publication Data

US 2019/0257403 A1 Aug. 22, 2019

(30) Foreign Application Priority Data

Feb. 22, 2018 (DE) .......................... 102018001400.3

(51) Int. Cl.
| | |
|---|---|
| *F16H 57/02* | (2012.01) |
| *F16H 57/00* | (2012.01) |
| *F02B 67/04* | (2006.01) |
| *F02B 67/06* | (2006.01) |

(52) U.S. Cl.
CPC ......... *F16H 57/0031* (2013.01); *F02B 67/04* (2013.01); *F02B 67/06* (2013.01); *F16H 57/02004* (2013.01); *F16H 2057/0056* (2013.01); *F16H 2057/02043* (2013.01)

(58) Field of Classification Search
CPC ............... F16H 7/08; F16H 2057/0056; F16H 57/0031; F02B 67/06; F02B 67/04
See application file for complete search history.

(56) References Cited

U.S. PATENT DOCUMENTS

| | | |
|---|---|---|
| 4,218,939 A | 8/1980 | Castoe |
| 4,684,357 A | 8/1987 | Hooper |
| (Continued) | | |

FOREIGN PATENT DOCUMENTS

| | | | |
|---|---|---|---|
| CN | 106337911 A | * | 1/2017 |
| CN | 106337911 A | | 1/2017 |
| DE | 102008037057 A1 | | 2/2010 |
| (Continued) | | | |

*Primary Examiner* — Randell J Krug
(74) *Attorney, Agent, or Firm* — Brown & Michaels, PC

(57) ABSTRACT

The present invention relates to a method for the assembly of or for preparing to assemble a traction drive module (10) in a drivetrain (2) with the method steps: providing a traction drive module (10) having a transmission housing (18) in which are arranged a first gear wheel (40) rotatably mounted on the transmission housing (18), a second gear wheel (48) arranged at a center-to-center distance (58) to the first gear wheel (40), and a traction means (46) via which the first and second gear wheel (40, 48) are in rotary driving connection with one another; attaching an assembly aid (16) acting between the second gear wheel (48) and the transmission housing (18) and detachable from the traction drive module (10); and changing the center-to-center distance (58) by moving the second gear wheel (48) relative to the transmission housing (18) while adjusting a predetermined tension of the traction means (46) by means of the detachable assembly aid (16). In addition, the present invention relates to a traction drive module (10).

16 Claims, 7 Drawing Sheets

(56) References Cited

U.S. PATENT DOCUMENTS

Figure 1:
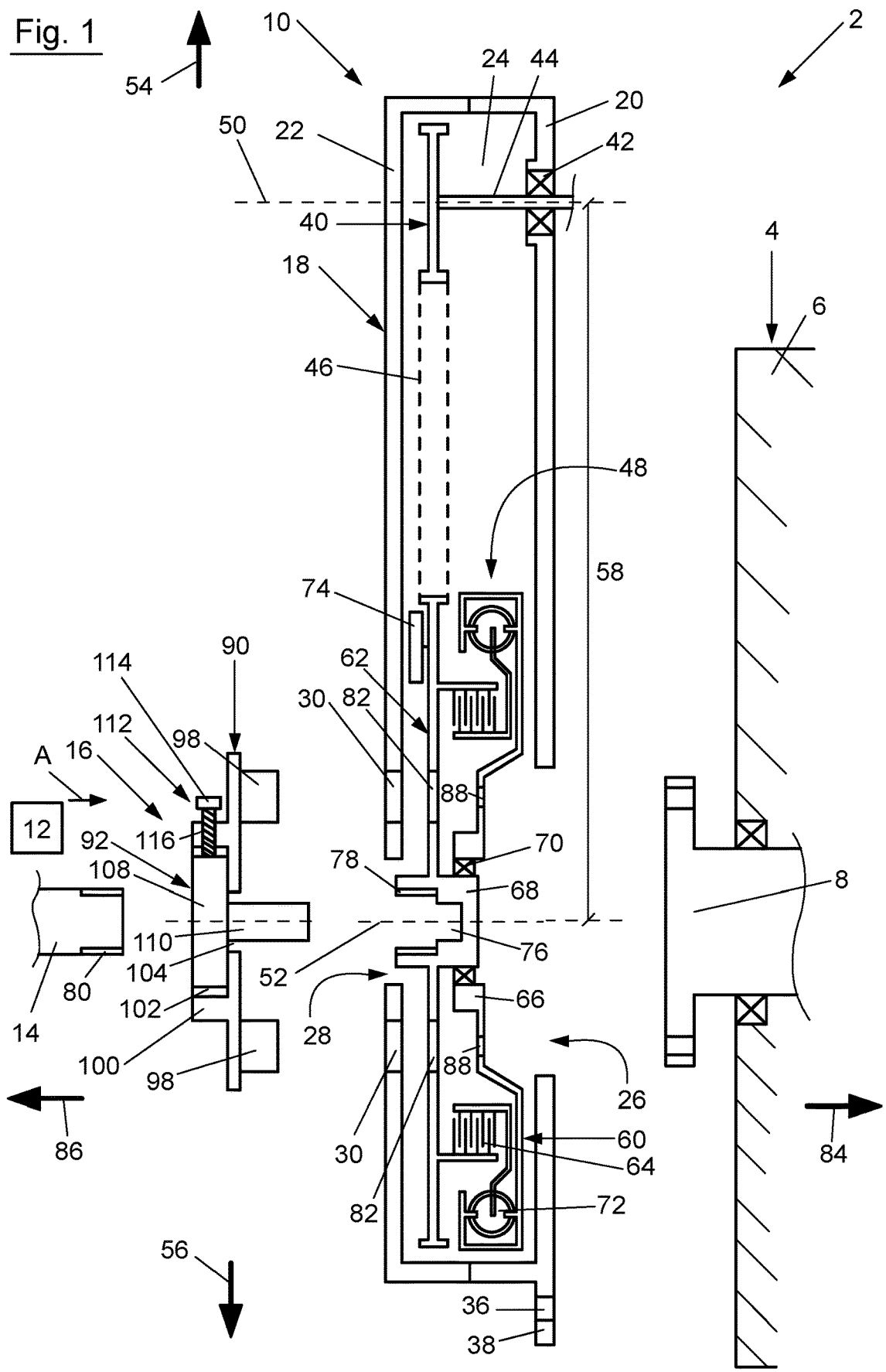

| | | |
|---|---|---|
| 4,770,399 A | 9/1988 | Sosson et al. |
| 2011/0165980 A1 | 7/2011 | Hoeting et al. |

FOREIGN PATENT DOCUMENTS

| | | |
|---|---|---|
| DE | 102010062325 A1 | 6/2012 |
| JP | H07317861 A | 12/1995 |
| JP | H11303954 A | 11/1999 |

* cited by examiner

METHOD FOR THE ASSEMBLY OF OR FOR PREPARING TO ASSEMBLE A TRACTION DRIVE MODULE AND A TRACTION DRIVE MODULE

CROSS-REFERENCE TO RELATED APPLICATIONS

This application claims the benefit of German Patent Application No. 102018001400.3 filed Feb. 22, 2018 the disclosure of which is herein incorporated by reference in its entirety

DESCRIPTION

The present invention relates to a method for the assembly of or for preparing to assemble a traction drive module in a drivetrain and a traction drive module suitable for this purpose.

An arrangement for a drive connection of a starter generator to an internal combustion engine crankshaft is known from DE 10 2008 037 057 A1, wherein a traction drive in the form of a chain drive is disclosed. The known traction drive is composed essentially of a first gear wheel, which is in rotary driving connection with the input side of the starter generator via additional gears, a second gear wheel arranged at a center-to-center distance with respect to the first gear wheel, and a traction means via which the first and second gear wheels are in rotary driving connection with one another. In contrast, the second gear wheel is in rotary driving connection with the crankshaft of an internal combustion engine, wherein the described components are generally covered by a transmission housing. To achieve the desired or necessary tension of the traction means in the known traction drive, at least one tensioning device is additionally arranged permanently in the housing, which may be pressed laterally against the traction means in order to correspondingly increase the tension. During the assembly of such a traction drive within the drivetrain, the listed components of the traction drive are generally fixed successively on the engine block or on an adjacent housing of the engine block in order to subsequently generate the necessary tension of the traction means via the tensioning device.

Said method for the assembly of the traction drive in a drivetrain is relatively time intensive. In addition, the tensioning device within the traction drive not only has the disadvantage that this increases the weight and the necessary installation space, but also the tensioning of the tensioning device against the traction means additionally has the effect that friction is generated between the tensioning device and the traction means, which in turn has an influence on the operating behavior of the traction drive. Furthermore, precautions must be undertaken at this point to prevent wear on the tensioning device and/or the traction means.

It is therefore the object of the present invention to specify a method for the assembly of or for preparing to assemble a traction drive module in a drivetrain which may be carried out quickly and easily and additionally makes a tensioning device of the type described at the outset dispensable. In addition, the underlying object of the present invention is to create a traction drive module which facilitates the assembly of the same within the drivetrain and makes a tensioning device of the type described at the outset dispensable.

This problem is solved by the features listed in Patent claim 1 or 3. Advantageous embodiments of the invention are the subject matter of the subclaims.

The method according to the invention functions for the assembly of or at least the preparation for the assembly of a traction drive module in a drivetrain, preferably a drivetrain of a motor vehicle or hybrid vehicle, and has the method steps subsequently described in greater detail. First, a traction drive module is provided. The traction drive module provided has a transmission housing, in which are arranged a first gear wheel rotatably mounted on the transmission housing, a second gear wheel arranged at a center-to-center distance to the first gear wheel, and a traction means, via which the first and second gear wheel are in rotary driving connection. The traction drive module provided is thereby preferably designed in such a way that the listed components are connected in a captive manner to one another to guarantee a simple assembly. Subsequently an assembly aid, detachable from the traction drive module, is applied to the traction drive module provided in this way. The assembly aid is thereby applied to the traction drive module in such a way that this acts, preferably directly, between the second gear wheel and the transmission housing. Thus, the assembly aid, detachably applied to the traction drive module, may be, for example, supported or supportable indirectly on the second gear wheel on the one side and on the transmission housing on the other. Subsequently, the center-to-center distance between the first and second gear wheels is changed by moving the second gear wheel relative to the transmission housing while adjusting a predetermined tension of the traction means by means of the detachable assembly aid. In other words, the first gear wheel maintains its position relative to the transmission housing due to its mounting on the transmission housing, while the second gear wheel is moved relative to the transmission housing with the aid of the detachable assembly aid so that the center-to-center distance and thus also the tension of the traction means changes upon reaching a predetermined tension. It is hereby preferred if the assembly aid acts between the transmission housing and the second gear wheel in such a way that the changed center-to-center distance and thus also the adjusted predetermined tension of the traction means are maintained by the applied assembly aid. One advantage of the described method consists in that the traction drive module prepared for the assembly in this way may be installed particularly easily in the drivetrain in a subsequent assembly step, particularly as the traction means of the traction drive already has the desired tension before the traction drive is installed in the drivetrain. In addition, it is clear from the preceding description that such a traction drive module requires no additional tensioning device within the transmission housing as, after the assembly within the drivetrain, the predetermined tension of the traction means is already present and the assembly aid may be released again and removed.

One preferred embodiment of the method according to the invention for the assembly of the traction drive module prepared in the previously described way in a drivetrain additionally has the following method steps. Thus, the second gear wheel is connected to a rotatable hub of a drivetrain while establishing a rotary driving connection between the second gear wheel and the hub and while maintaining the center-to-center distance and the predetermined tension. The hub of the drivetrain may be, for example, an output hub of a drive unit, preferably of an internal combustion engine. The connection between the second gear wheel and the hub of the drivetrain may be achieved, for example, by a screw connection. The transmission housing is subsequently fixed within the drivetrain, wherein this in turn is preferably carried out by a screw connection. It is also thereby preferred if the transmission housing is fixed on an adjacent housing of the drivetrain, for example, the housing of the drive unit or the housing of a transmission. Due to the two previously described method steps, it is ensured that the relative arrangement between the transmission housing on the one side and the second gear wheel on the other is set or fixed. Consequently, the center-to-center distance between the first and second gear wheels, and thus the previously adjusted predetermined tension, is also set or fixed, particularly as the first gear wheel is mounted or supported on the transmission housing so that its relative arrangement with respect to the transmission housing also has not changed in the context of the assembly. Consequently, the assembly aid may be subsequently detached and removed from the traction drive module so that a traction drive has been created within the drivetrain that does not have nor does it need any additional tensioning device acting directly on the traction means.

The traction drive module according to the invention has a transmission housing. In the transmission housing, there is a first gear wheel rotatably mounted on the housing, a second gear wheel arranged in a center-to-center distance to the first gear wheel, and a traction means via which the first and second gear wheel are in rotary driving connection with one another. The listed components of the traction drive module are preferably arranged on one another in a captive manner in order to facilitate a simple assembly in a drivetrain of a motor vehicle. The traction drive module is also preferably designed in such a way that it is usable in an embodiment of the previously described method. Even if a transmission housing accommodating the listed components is consistently discussed here, the transmission housing need not completely surround the listed components. As the first gear wheel is rotatably mounted on the transmission housing, its relative arrangement with respect to the transmission housing is not changeable, or only within certain tolerances of the mounting. In contrast, the second gear wheel is moveable relative to the transmission housing while changing the center-to-center distance between the first gear wheel and the second gear wheel and while adjusting a predetermined tension of the traction means, wherein this movement is preferably a movement in the radial direction of the second gear wheel. Consequently, a traction drive module is created in which the predetermined tension of the traction means may be easily adjusted by changing the center-to-center distance between the first and second gear wheels, as a result of which both an additional tensioning device that acts directly on the traction means may be omitted, and also said traction drive module may additionally be assembled particularly easily in a drivetrain without requiring a subsequent tensioning of the traction means via a tensioning device acting directly on the traction means.

In one preferred embodiment of the of the traction drive module according to the invention, an assembly aid is provided, which acts between the second gear wheel and the transmission housing and by means of which the second gear wheel may be moved relative to the transmission housing to change the center-to-center distance between the first and second gear wheel, and consequently to change the tension of the traction means. The assembly aid is thereby detachably and removably applied to the traction drive module so that it is not only removed after the assembly, but it may also be used for another traction drive module.

In one particularly preferred embodiment of the traction drive module according to the invention, the assembly aid has a first retaining part which is mounted or mountable on the transmission housing, and a second retaining part which is mounted or mountable on the second gear wheel, optionally on a hub of the second gear wheel. The first and second retaining parts may thereby be moved relative to one another so that a corresponding relative movement may also be carried out between the transmission housing and the second gear wheel upon actuating the assembly aid in order to change the center-to-center distance between the first and second gear wheels and to adjust the tension of the traction means.

Basically, the tension adjusted by the assembly aid might be maintained by an additional aid, in that this is arranged, for example, supportingly between the transmission housing and the second gear wheel. However, in one advantageous embodiment of the traction drive module according to the invention, the first and second retaining parts of the assembly aid are fixable or fixed in their respective positions relative to one another so that the transmission housing and the second gear wheel are also fixed or fixable in their relative arrangement respectively achieved by the assembly aid.

In another advantageous embodiment of the traction drive module according to the invention, the one of the two retaining parts is guided in a guide in the other of the two retaining parts in order to enable a previously determinable or targeted movement of the one retaining part relative to the other retaining part. It is hereby preferred if the guide is designed in such a way that the retaining parts are moved in a straight line movement relative to one another, wherein a linear guide may also be discussed here.

To simplify the operability and adjustability of the assembly aid, a drive device for moving the first and second retaining parts relative to one another is provided in one particularly advantageous embodiment of the traction drive module according to the invention. The drive device is preferably designed in such a way that a stepless movement of the first and second retaining parts relative to one another is possible. The drive device may also be designed in such a way that the first and second retaining parts may be moved manually or electrically toward one another. In this context, drive devices have proven advantageous that are designed as screw drives, cam drives, eccentric drives, or spindle drives.

According to another preferred embodiment of the traction drive module according to the invention, multiple assembly openings are provided in the transmission module. The assembly openings may thereby function exclusively for mounting the assembly aid; however, it is also possible that said assembly openings, through which, for example, screws or tools may be guided, may also be used for fixing the second gear wheel on a hub of the drivetrain. The first retaining part has at least two protruding projections which are introduced or introducible into the assembly openings when mounting the first retaining part on the transmission housing. Due to the at least two protruding projections introduced into the assembly opening, both a support on the transmission housing is ensured and also a securing against rotation of the first retaining part relative to the transmission housing is guaranteed.

According to another preferred embodiment of the traction drive module according to the invention, the previously mentioned assembly openings in the transmission housing are arranged in alignment with fixing openings in the second gear wheel, which function for fixing the second gear wheel on a hub of the drivetrain. Here as also previously, it is preferred if the assembly openings are arranged distributed across a common diameter and in the circumferential direction, which also preferably applies for said fixing openings in the second gear wheel.

In another particularly preferred embodiment of the traction drive module according to the invention, when a first retaining part is mounted on the transmission housing, at least two assembly openings in the transmission housing remain accessible, and thus are not covered or occupied by the first retaining part or its protruding projections. By this means it is ensured that the second gear wheel may be fixed via the two assembly openings in the transmission housing on the one hand, and on the other hand on the hub of the drivetrain via the fixing openings in the second gear wheel arranged aligned with said assembly openings before—as previously described—the transmission housing is fixed in the drivetrain and the assembly aid is loosened and removed. In connection with this, those assembly openings, which were previously covered or occupied by the first retaining part, are used for the additional fixing of the second gear wheel on the hub of the drivetrain. The preadjusted tension of the traction means or the center-to-center distance between the first and second gear wheels is retained by this means. In this embodiment, it is additionally preferred if those at least two assembly openings, which remain accessible when a first retaining part is mounted on the transmission housing, are accessible via recesses on the first retaining part, wherein the recesses may be windows or notches in the first retaining part. In this way, both a lightweight assembly aid is created, and also the assembly openings as a whole may be arranged on a common circumferential circle, as already previously indicated.

If the first retaining part of the assembly aid is introduced with its protruding projections into the assembly openings, and if the first retaining part is offset relative to the second retaining part to generate the desired tension of the traction means, then, it is already largely ensured due to the tension that the first retaining part may not fall off again from the transmission housing in a direction opposite to the insertion direction of the protruding projections. However, to increase the safety and to be able to easily transport the traction drive module prepared in such a way, at least one fixing means for fixing the first retaining part in the direction opposite to the insertion direction of the protruding projections is provided on the first retaining part in another advantageous embodiment of the traction drive module according to the invention.

To simplify the handling of the at least one fixing means provided on the first retaining part for fixing the first retaining part in the direction opposite the insertion direction of the protruding projections, the fixing means is moveable from an insertion position, in which the fixing means is insertable into one of the assembly openings, into a fixing position, in which the fixing means engages behind the edge of the assembly opening in another advantageous embodiment of the traction drive module according to the invention. The fixing means may thereby be inserted preferably into the same assembly openings as one of the protruding extensions of the first retaining part. This is preferred insofar as the other assembly openings, which are not covered by the retaining part when the first retaining part is mounted on the transmission housing and thus are accessible, may be employed for the previously described fixing of the second gear wheel on the hub of the drivetrain. However, it is likewise possible that the fixing means are insertable into an assembly opening which is not used or occupied by the retaining part.

In another preferred embodiment of the traction drive module according to the invention, at least one frontal indentation is provided in the second gear wheel whereas the second retaining part of the assembly aid has at least one protruding projection which is insertable or inserted into the indentation during the mounting of the second retaining part on the second gear wheel. The indentation is preferably designed as a central indentation and particularly preferably designed in a hub of the second gear wheel. Both have the advantage that the protruding projection on the second retaining part may be guided, for example, through an already present opening in the transmission housing onto the central indentation, optionally onto the central indentation in the hub of the second gear wheel, via which the second gear wheel may later be connected to another hub of the drivetrain, for example, the hub of a transmission.

According to another advantageous embodiment of the traction drive module according to the invention, the second gear wheel has a first gear wheel section and a second gear wheel section rotatable relative to the first gear wheel section, wherein the second gear wheel section is in rotary driving connection with the first gear wheel via the traction means. In addition, a clutch is provided, via which the first and second gear wheel sections may be selectively brought into rotary driving connection with one another. The clutch is preferably a disk clutch. This embodiment of the traction drive module is particularly suited for the drivetrain of hybrid vehicles in which the traction drive module couples an electric machine to the output side of an internal combustion engine, wherein the clutch may be separated if the drivetrain is to be driven solely electrically.

In another advantageous embodiment of the traction drive module according to the invention, the first gear wheel section has an input hub which is mounted on the output hub of the second gear wheel section. Thus, in this embodiment, the assembly aid may interact, for example, with the second gear wheel section of the second gear wheel, wherein a relative movement of the second gear wheel section with respect to the transmission housing due to the mounting likewise causes a relative movement of the first gear wheel section with respect to the transmission housing.

In another advantageous embodiment of the traction drive module according to the invention, the first gear wheel section has a torsional vibration damper to damp torsional vibrations.

In another advantageous embodiment of the of the traction drive module according to the invention, a centrifugal force pendulum is arranged on the second gear wheel section to cancel rotary vibrations.

In another preferred embodiment of the traction drive module according to the invention, the traction means is designed as a chain, while the first and second gear wheels, preferably the second gear wheel section of the second gear wheel, is/are designed as sprockets. Consequently, the traction drive in this embodiment of the traction drive module is designed as a chain drive which guarantees a particularly secure torque transmission between the first and second gear wheels.

Figure 2:
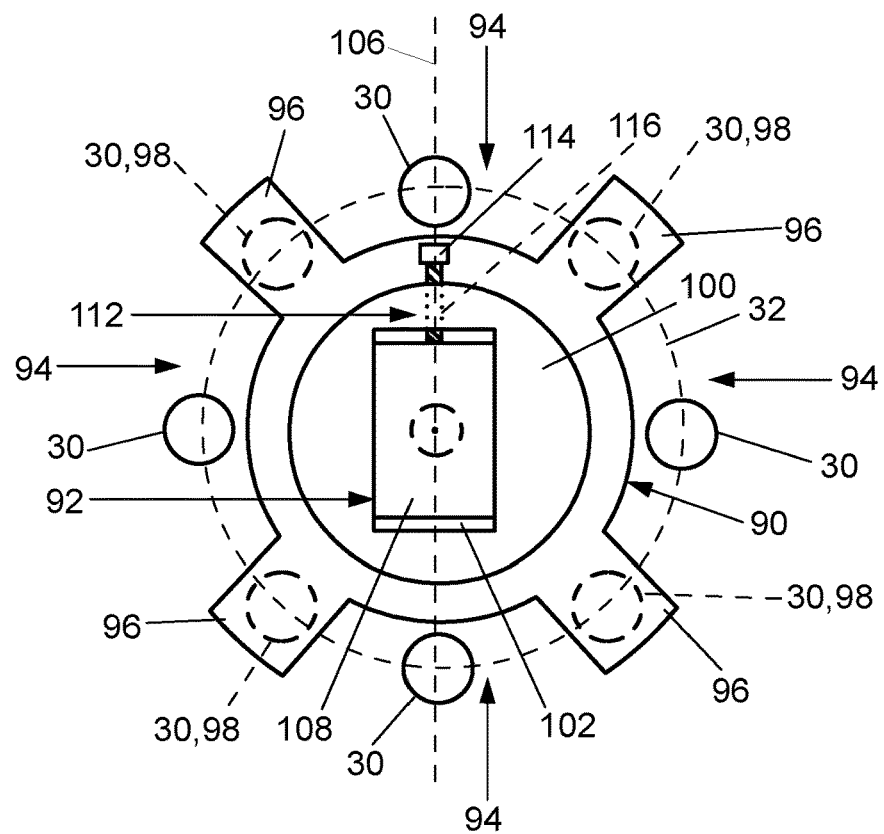
Figure 3:
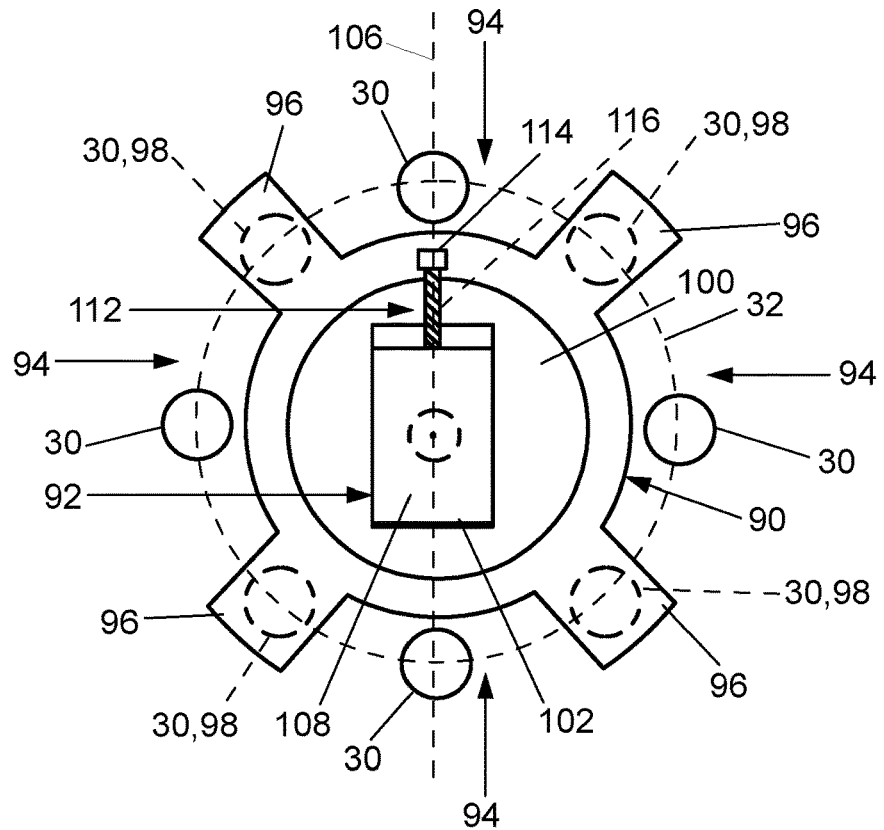
Figure 4:
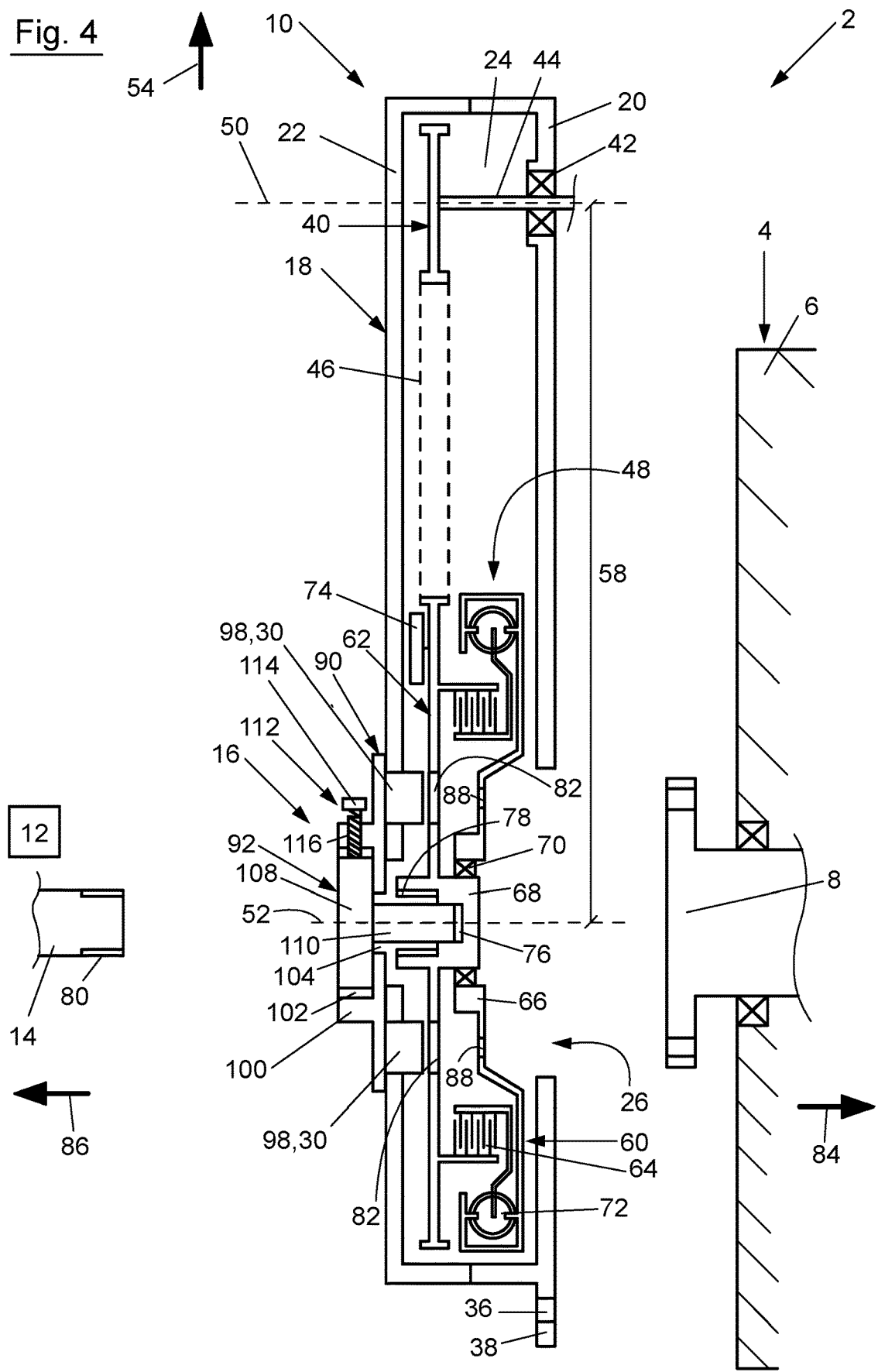
Figure 5:
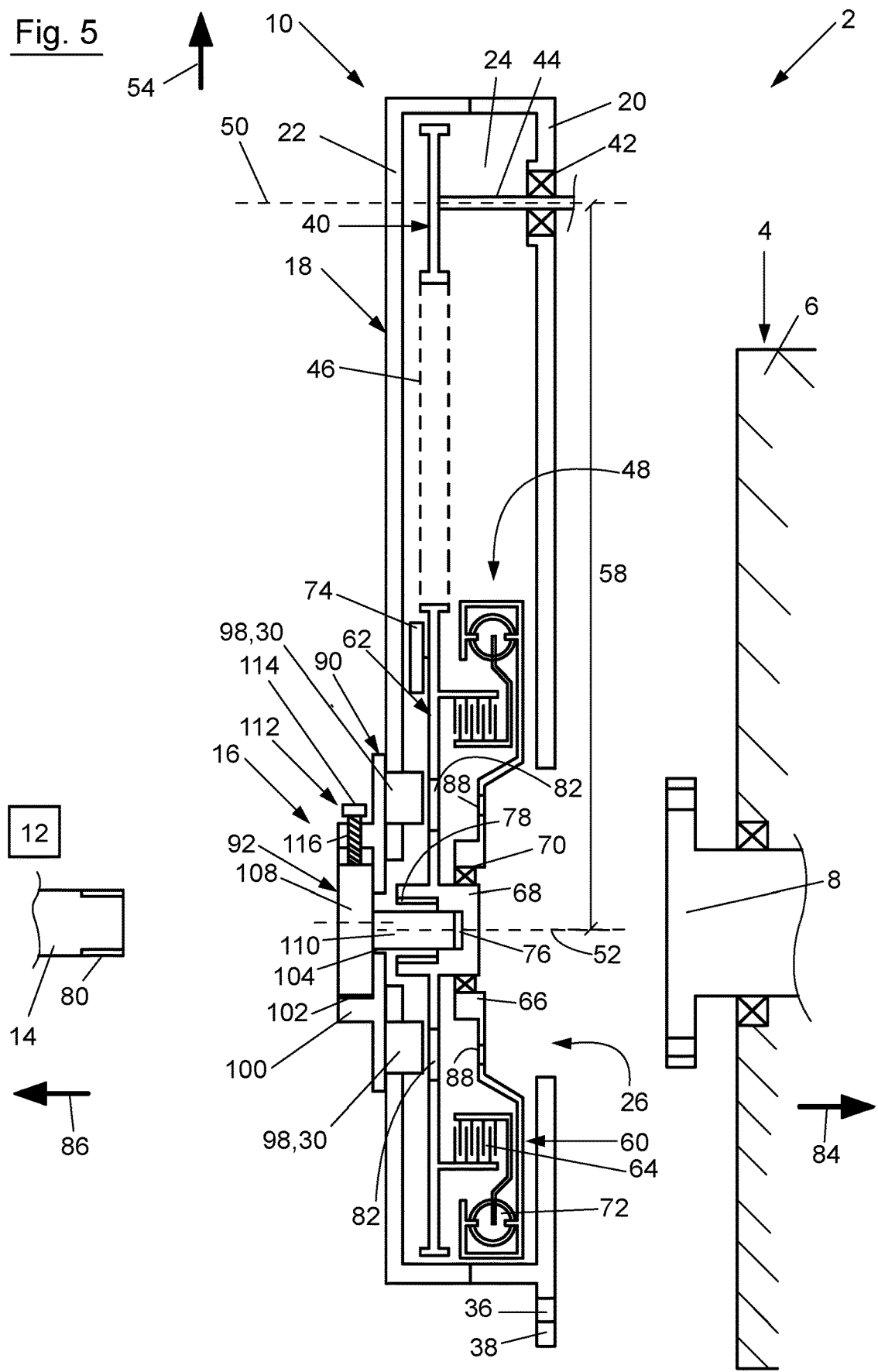
Figure 6:
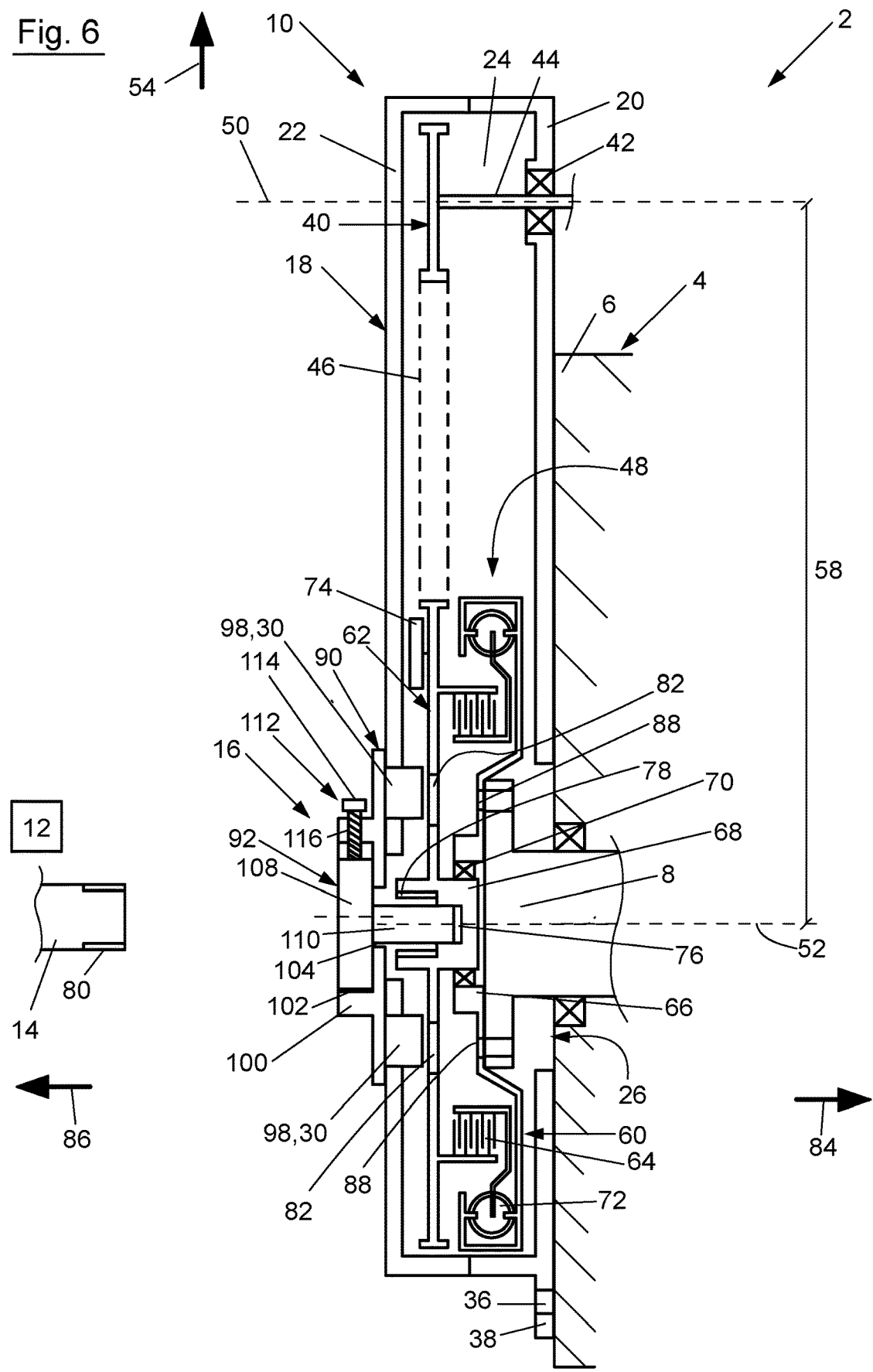
Figure 7:
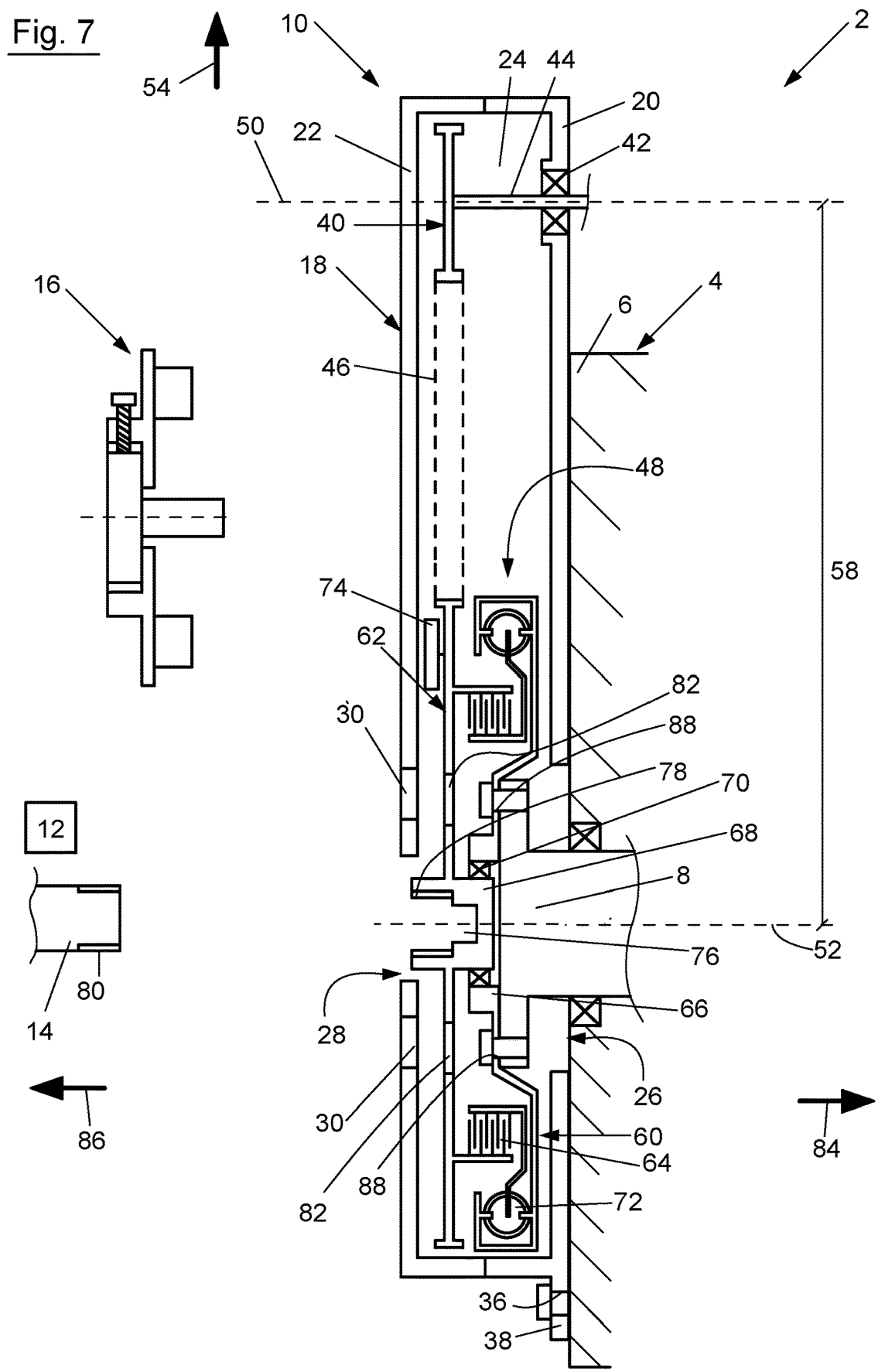
Figure 8:
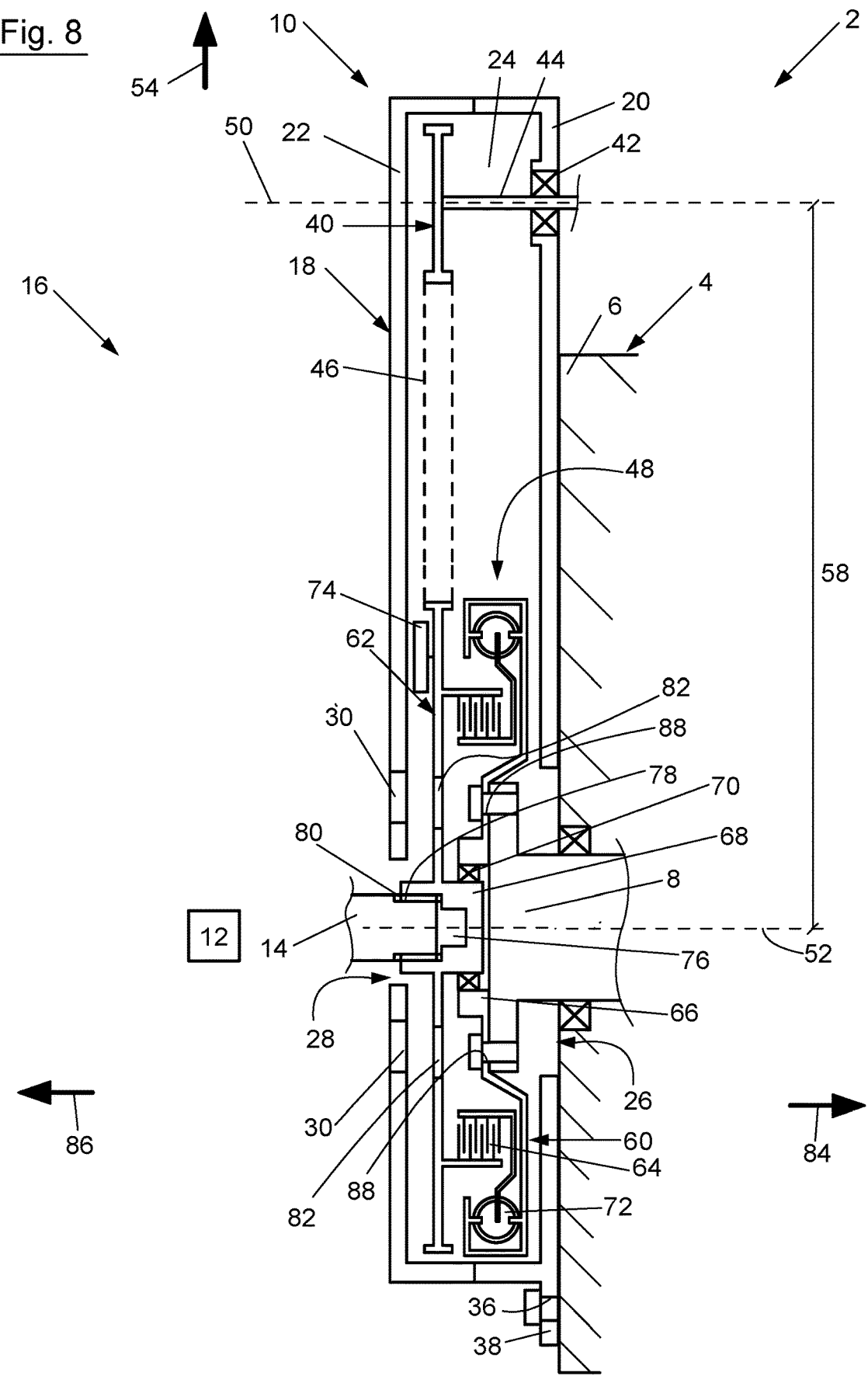

The present invention is subsequently described in greater detail by way of an exemplary embodiment with reference to the appended drawings. As shown in:

FIG. 1 a partial side view of a drivetrain of a hybrid vehicle with one embodiment of a traction drive module before the assembly of the same in the drivetrain in a sectional depiction, FIG. 2 a view of the assembly aid from FIG. 1 in the direction of arrow A with the retaining parts in a first relative arrangement, FIG. 3 the assembly aid from FIG. 2 with the retaining parts in a second relative arrangement, FIG. 4 the drivetrain from FIG. 1 with the assembly aid mounted on the traction drive module and the retaining parts in the first relative arrangement according to FIG. 2, FIG. 5 the drivetrain from FIG. 4 with the two retaining parts in the second relative arrangement according to FIG. 3, FIG. 6 the drivetrain from FIG. 5 after a first fixing of the second gear wheel on an output hub of the internal combustion engine and the fixing of the transmission housing on the engine housing, FIG. 7 the drivetrain from FIG. 6 after the loosening and removal of the assembly aid and after a second fixing of the second gear wheel on the output hub of the internal combustion engine, and FIG. 8 the drivetrain from FIG. 7 after coupling the transmission input shaft to the second gear wheel.

FIG. 1 shows a drivetrain 2 for a hybrid vehicle before its assembly, which has an internal combustion engine 4, of which housing 6 and output hub 8 of the crankshaft are shown, a traction drive module 10, and a transmission 12, wherein only an input hub 14 is shown of the latter. In addition, an assembly aid 16 is assigned to traction drive module 10, is detachably mountable on traction drive module 10, and is used in the context of the assembly of drivetrain 2.

Traction drive module 10 has a transmission housing 18, wherein transmission housing 18 is substantially composed from two transmission housing parts 20, 22. Transmission housing 18 surrounds an interior 24, which is accessible on the one side via an opening 26 in transmission housing part 20, and on the other side via an opposite opening 28 in transmission housing part 22. Opening 28 is surrounded by multiple assembly openings 30, which are arranged on a common circumferential circle 32—as is clear from FIG. 2. In the embodiment shown, for example, eight assembly openings 30 are provided. Transmission housing 18 additionally has multiple fixing openings 36, in this case on flange sections 38, via which fixing openings transmission housing 18 is fixable on housing 6 of internal combustion engine 4, which will be discussed again later in greater detail.

A first gear wheel 40 of a traction drive is arranged in interior 24 of transmission housing 18, wherein the traction drive is designed as a chain drive. Consequently, first gear wheel 40 is designed as a sprocket. First gear wheel 40 is rotatably mounted on transmission housing 18, stated more precisely on transmission housing part 20, via a radial bearing 42, wherein the mounting is carried out via a shaft 44 which leads out of transmission housing 18 in order to be connected or connectable to an output or input of an electric machine, not depicted here in greater detail. Due to the mounting of first gear wheel 40 on transmission housing 18 via radial bearing 42, first gear wheel 40 is indeed rotatable, however, not moveable in the radial direction of shaft 44 relative to transmission housing 18, at most within the context of the low play of radial bearing 42.

In addition, a traction means 46, which is designed as an endless circulating traction means, extends in interior 24 of transmission housing 18. First gear wheel 40 is in rotary driving connection via traction means 46 with second gear wheel 48, which is likewise arranged within transmission housing 18 or its interior 24. Because it is a chain drive, traction means 46 is designed as a chain, while second gear wheel 48 is designed, at least in parts, as a sprocket. A center-to-center distance 58 is formed in transverse directions 54, 56 between axis of rotation 50 of first gear wheel 40 and axis of rotation 52 of second gear wheel 48, indicated in FIG. 1, wherein second gear wheel 48 is moveable in indicated transverse directions 54, 56 relative to transmission housing 18 while changing center-to-center distance 58 and while adjusting a predetermined tension of traction means 46, for example, wherein this will be discussed again later in greater detail.

Second gear wheel 48 is composed of a first gear wheel section 60 and a second gear wheel section 62, wherein the two gear wheel sections 60, 62 are rotatable relative to one another about axis of rotation 52 when clutch 64, to be described later in greater detail, is open. First gear wheel section 60 has an input hub 66 via which a torque of output hub 8 of internal combustion engine 4 is transmittable to first gear wheel section 60 within a completely mounted drivetrain 2. In contrast, second gear wheel section 62 has an output hub 68, wherein input hub 66 is rotatably mounted on output hub 68 via a radial bearing 70.

Furthermore, first gear wheel section 60 has a torsional vibration damper 72, which acts between input hub 66 and clutch 64. Clutch 64 acts in turn between first gear wheel section 60 and second gear wheel section 62 in such a way that first gear wheel section 60 may be selectively brought into rotary driving connection with second gear wheel section 62, wherein clutch 64 in the embodiment depicted is designed by way of example as a disk clutch. A depiction of the actuating device for clutch 64 was omitted for reasons of clarity.

Second gear wheel section 62 has the toothing of second gear wheel 48 designed as a sprocket so that second gear wheel section 62 is in rotary driving connection with first gear wheel 40 via traction means 46, whereas this is indirectly the case for first gear wheel section 60 via clutch 64, when clutch 64 is closed. In addition, at least one centrifugal force pendulum 74 is arranged on second gear wheel section 62, which is merely indicated schematically in FIG. 1.

Input hub 66 is arranged on the side of second gear wheel 48 facing opening 26, while output hub 68 is arranged on the side of second gear wheel 48 facing opening 28. In addition, it is clear from FIG. 1 that a central, frontal indentation 76 is provided in the side of output hub 68 facing opening 28, which functions for the subsequent mounting of assembly aid 16. In addition, an inner toothing 78 is designed in a front section of indentation 76, which functions for the subsequent rotary driving connection with an outer toothing 80 on input hub 14 of transmission 12. Inner toothing 78 thereby has an inner diameter, which is larger than the inner diameter in the rear section of indentation 76.

Assembly openings 82 are arranged distributed in the circumferential direction in second gear wheel section 62, which are arranged aligned with assembly openings 30 in transmission housing 18 in the indicated longitudinal directions 84, 86 of drivetrain 2 or of traction drive module 10 in a corresponding rotational position of second gear wheel 48. Furthermore, multiple fixing openings 88 are arranged distributed in the circumferential direction in first gear wheel section 60, wherein fixing openings 88 are arranged aligned with assembly openings 82 in longitudinal direction 84, 86 in the corresponding rotational position of first gear wheel section 60 to second gear wheel section 62. In addition, fixing openings 88 are arranged aligned with assembly openings 30 within transmission housing 18 in longitudinal directions 84, 86 in a corresponding rotational position of second gear wheel 48 relative to transmission housing 18.

Fixing openings 88 function for fixing first gear wheel section 60 on output hub 8 of internal combustion engine 4, wherein, for example, a screw may be guided through assembly openings 30 and 82 into respective fixing opening 88. In a corresponding way, a tool may also be guided through assembly openings 30, 82 to the screw in respective fixing opening 88 to actuate said screw, in order to facilitate screwing in of the screw through fixing opening 88 into corresponding openings in output hub 8 of internal combustion engine 4.

Assembly aid 16, which is subsequently described with reference to FIGS. 1 through 3, is assigned to traction drive module 10. Assembly aid 16 has a first retaining part 90 mounted or mountable on transmission housing 18 and a second retaining part 92, mounted or mountable on second gear wheel 48, stated more precisely on output hub 68 of second gear wheel section 62.

First retaining part 90 is designed as substantially disk shaped and has recesses 94 on its circumferential edge, which are spaced apart from one another in the circumferential direction in such a way that first retaining part 90 has arms 96 spaced apart from one another in the circumferential direction, wherein recesses 94 are designed in this case as notches. On the side of first retaining part 90 facing in longitudinal direction 84, at least two, in the present example four protruding projections 98 are provided, in this case on arms 96. Said protruding projections 98 may be inserted into assembly openings 30 within transmission housing 18 in longitudinal direction 84 when mounting first retaining part 90 on transmission housing 18.

As is clear from FIGS. 2 and 3, in which assembly openings 30 in transmission housing 18 are additionally indicated, in the case of a first retaining part 90 mounted on transmission housing 18, at least two of assembly openings 30, in the present example four assembly openings 30, remain accessible via recesses 94 in first retaining part 90, whereas protruding projections 98 extend into four other assembly openings 30, which are consequently covered by first retaining part 90 or its arms 96 and protruding projections 98.

On the side facing in longitudinal direction 86, first retaining part 90 has an elevated section 100, in which an indentation is provided in the form of a guide 102. In the bottom of said guide 102, a recess 104 is provided in turn. Guide 102 functions for guiding second retaining part 92 relative to first retaining part 90, so that first and second retaining part 90, 92 are moveable relative to one another, in this case along a straight line movement path 106.

In order to be able to be moved along straight line movement path 106 relative to first retaining part 90, second retaining part 92 has a guide section 108 guided in guide 102, which is supported transverse to movement path 106 on the wall of the guide and is displaceable in the direction of movement path 106. A protruding projection 110 of second retaining part 92 connects to the side of guide section 108 facing in longitudinal direction 84, said projection being insertable into frontal indentation 76 of output hub 68 when mounting second retaining part 92 on second gear wheel 48, stated more precisely, on output hub 68 of second gear wheel section 62. For this purpose, protruding projection 110 extends in longitudinal direction 84 through recess 104, wherein protruding projection 110 is designed as substantially cylindrical in order to be able to be inserted into likewise cylindrical indentation 76. This additionally has the advantage that second gear wheel 48 may itself be rotated about axis of rotation 52 by mounted assembly aid 16 relative to transmission housing 18 in order for assembly openings 30 to be able to be arranged in alignment, optionally retroactively, with assembly openings 82 and fixing openings 88. Generally stated, assembly aid 16 is mountable on traction drive module 10 in such a way that second gear wheel 48 remains rotatable.

As already indicated, two retaining parts 90, are moveable relative to one another along movement path 106. Thus, FIGS. 1 and 2 show a first relative arrangement between first and second retaining parts 90, 92, while FIGS. 3 and 5 show a second relative arrangement between first and second retaining parts 90, 92. To simplify the handling of assembly aid 16, this has a drive device 112 which functions for driving or moving first and second retaining parts 90, 92 relative to one another. Drive device 112 is thereby designed in such a way that two retaining parts 90, 92 may be moved steplessly relative to one another. In the figures, drive device 112 is exemplarily designed as a screw drive, in which a screw 114 is screwable into a threaded hole 116 on first retaining part 90 in order to thereby act on second retaining part 92 or its guide section 108. In addition, drive device 112 may alternatively be designed as a cam drive, eccentric drive, or spindle drive. Drive device 112 is also to be designed in such a way that first and second retaining parts 90, 92 are fixed or fixable in the respective relative positions to one another, preferably by drive device 112 itself, in order to achieve a simple structure of assembly aid 16 and to simplify handling of the same.

Subsequently, the preparation for the assembly of traction drive module 10 is described initially with reference to FIGS. 1 through 5, before the completed assembly in drivetrain 2 is described with reference to FIGS. 6 through 8.

In the context of the preparation for the assembly, initially traction drive module 10 and assembly aid 16, which is designed separately from traction drive module 10, are provided. Subsequently, assembly aid 16 is mounted on traction drive module 10 in order to be able to act between second gear wheel 48 and transmission housing 18, wherein the mounting is carried out in such a way that assembly aid 16 is detachable and removable from traction drive module 10.

As shown in FIG. 4, assembly aid 16 is guided in longitudinal direction 84 on traction drive module 10. Protruding projections 98 on first retaining part 90 thereby plunge into assigned assembly openings 30 in transmission housing 18. Due to this positive locking, it is ensured that assembly aid 16 or its first retaining part 90 is no longer displaceable in transverse directions 54, 56 relative to transmission housing 18 nor rotatable relative to transmission housing 18. As already previously depicted with reference to FIG. 2, some assembly openings 30 in transmission housing 18 thereby remain accessible via recesses 94 between arms 96 of first retaining part 90.

In addition, protruding projection 110 of second retaining part 92 plunges in longitudinal direction 84 into frontal indentation 76 of output hub 68 so that protruding projection 110 of second retaining part 92 is arranged coaxial to second gear wheel 48. Consequently, an operative connection is established between transmission housing 18 and second gear wheel 48 via assembly aid 16 or its retaining parts 90, 92.

In connection to this, center-to-center distance 58 between first gear wheel 40 and second gear wheel 48 is changed in order to achieve a predetermined tension of traction means 46. For this purpose, second gear wheel 48 is moved relative to transmission housing 18, for example, in one of transverse directions 54, 56. This movement is carried out with the aid of assembly aid 16, in that second retaining part 92 is moved from the first relative position according to FIG. 2 with the aid of drive device 112 into the second relative position, which is shown in FIG. 3. Because first retaining part 90 is fixed on transmission housing 18, while output hub 68 of second gear wheel 48 is fixed on second retaining part 92, second gear wheel 48 is also moved in transverse direction 56 relative to transmission housing 18, as is shown in FIG. 5. Because a corresponding movement of first gear wheel 40 is inhibited by its radial mounting on transmission housing 18, this leads to a change, in this case an increase, of the tension of traction means 46.

If the desired tension of traction means 46 is generated, wherein this may be monitored, for example, by means of a measuring device on drive device 112, on assembly aid 16, or elsewhere, then traction drive module 10, along with assembly aid 16, is prepared for assembly within drivetrain 2. Thus, prepared traction drive module 10, including assembly aid 16, may be particularly easily transported or delivered in order to be able to provide it for the further assembly of drivetrain 2.

Due to the tension adjusted for traction means 46, assembly aid 16 is already held relatively securely on traction drive module 10. However, in order to establish a particularly secure fixing, at least one fixing means for fixing first retaining part 90 may be supplementally provided on first retaining part 90 of assembly aid 16 in the direction opposite the insertion direction of protruding projections 98, in this case, previously mentioned longitudinal direction 86. Even if not depicted in greater detail, it is preferred in this case if the corresponding fixing means is displaceable from an insertion position, in which the fixing means may be inserted into one of assembly openings 30, into a fixing position, in which the fixing means engage behind the edge of assembly opening 30. Thus, for example, a corresponding pivotable tab or a corresponding pivotable latch may be provided on first retaining part 90. Said fixing means may thereby also be inserted into the same assembly opening 30 as one of protruding projections 98 in order to not cover the previously described, still accessible assembly openings 30; however, it is just as possible that such fixing means use one of those assembly openings 30 that is not covered by first retaining part 90.

In the context of the assembly of traction drive module 10 prepared in such a way within drivetrain 2, traction drive module 10 is initially guided onto internal combustion engine 4. Output hub 8 of internal combustion engine 4 thereby plunges through opening 26 in transmission housing 18 into interior 24 of transmission housing 18 in order to be able to be connected to second gear wheel 48, as this is shown in FIG. 6. Connection means, screws in the present example, are thereby inserted through accessible assembly openings 30 in transmission housing 18, shown in FIG. 2, and through assembly openings 82 in second gear wheel section 62 arranged aligned with said assembly openings, into fixing openings 88 within first gear wheel section 60 in order to connect or to screw first gear wheel section 60 rotatably fixedly to output hub 8 of internal combustion engine 4. If this is carried out, then assembly aid 16 initially remains on traction drive module 10 to maintain the tension of traction means 46 or center-to-center distance 58.

Transmission housing 18 is subsequently fixed on housing 6 of internal combustion engine 4, thus within drivetrain 2, via fixing openings 36, for example, by means of screws, wherein fixing openings 36 in flange sections 38 are used for this.

Due to the fixing of second gear wheel 48 on output hub 8 of internal combustion engine 4 on the one side, and the fixing of transmission housing 18 on housing 6 on internal combustion engine 4 on the other side, the predetermined tension of traction means 46, previously maintained solely by assembly aid 16, is now fixed so that assembly aid 16 may be loosened and removed from traction drive module 10, as this is indicated in FIG. 7. Thus, neither the continuous mounting of assembly aid 16 nor an additional tensioning device within transmission housing 18 that acts on traction means 46 is required in order to achieve the predetermined tensioning of traction means 46. For this reason, a corresponding tensioning device for traction means 46 continuously provided in traction drive module 10 is omitted. In addition, loosened and removed assembly aid 16 may be used for preparing another traction drive module 10.

Subsequently, connection means or screws are also inserted via assembly openings 30 previously covered by assembly aid 16, by means of which assembly openings another fixing of second gear wheel 48 on output hub 8 is carried out via fixing openings 88.

Subsequently input hub 14 of transmission 12 may be inserted through opening 28 in transmission housing 18 in order to achieve a rotary driving connection between input hub 14 and output hub 68 of second gear wheel 48, which is achieved via inner toothing 78 and outer toothing 80, as this is indicated in FIG. 8. Sealing means may still be introduced between transmission housing 18 and output hub 68 or input hub 14 which seal opening 28 and/or compensate for any eccentricity of output hub 68 or of input hub 14 with respect to opening 28.

LIST OF REFERENCE NUMERALS

2 Drivetrain
4 Internal combustion engine
6 Housing
8 Output hub
10 Traction drive module
12 Transmission
14 Input hub
16 Assembly aid
18 Transmission housing
20 Transmission housing part
22 Transmission housing part
24 Interior
26 Opening
28 Opening
30 Assembly openings
32 Circumferential circle
36 Fixing openings
38 Flange sections
40 First gear wheel
42 Radial bearing
44 Shaft
46 Traction means
48 Second gear wheel
50 Axis of rotation
52 Axis of rotation
54 Transverse direction
56 Transverse direction
58 Center-to-center distance
60 First gear wheel section
62 Second gear wheel section
64 Clutch
66 Input hub
68 Output hub
70 Radial bearing
72 Torsional vibration damper
74 Centrifugal force pendulum
76 Indentation
78 Inner toothing
80 Outer toothing 82 Assembly openings
84 Longitudinal direction
86 Longitudinal direction
88 Fixing openings
90 First retaining part
92 Second retaining part
94 Recesses
96 Arms
98 Protruding projections
100 Elevated section
102 Guide
104 Recess
106 Movement path
108 Guide section
110 Protruding projection
112 Drive device
114 Screw
116 Threaded hole

The invention claimed is:

1. A method for the assembly of a traction drive module (10) in a drivetrain (2) comprising the following steps:
providing a traction drive module (10) having a transmission housing (18) comprising: a first sprocket (40) rotatably mounted on the transmission housing (18), a second sprocket (48) arranged at a center-to-center distance (58) to the first sprocket (40), and a chain (46) via which the first and second sprockets (40, 48) are in rotary driving connection with one another;
mounting an assembly aid (16) acting between the second sprocket (48) and the transmission housing (18) and detachable from the traction drive module (10);
while adjusting a predetermined tension of the chain (46) by the detachable assembly aid (16), changing the center-to-center distance (58) by moving the second sprocket (48) relative to the transmission housing (18);
while establishing a rotary driving connection between the second sprocket (48) and the hub (8), and, while maintaining the predetermined tension, connecting the second sprocket (48) to a rotatable hub (8) of a drivetrain (2),
fixing the transmission housing (18) within the drivetrain (2) and on a housing (6) of the drivetrain (2), and
loosening and removing the assembly aid (16) from the traction drive module (10).

2. The method of assembly of claim 1, wherein the second sprocket (48) is moveable relative to the transmission housing (18) while changing the center-to-center distance (58) and while adjusting the predetermined tension of the chain (46).

3. The method of assembly of claim 2, wherein the second sprocket (48) has a first section (60) and a second section (62) rotatable relative to the first section (60), the second section (62) in rotary driving connection with the first sprocket (40) via the chain (46), the first section (60) and the second section (62) being able to be selectively brought into rotary driving connection with one another via a clutch (64), wherein the first section (60) comprises: an input hub (66) which is mounted on an output hub (68) of the second section (62) and a torsional vibration damper (72).

4. The method of assembly of claim 3, further comprising a centrifugal force pendulum (74) arranged on the second section (62).

5. The method of assembly of claim 2, wherein the second sprocket (48) is moveable relative to the transmission housing (18), by the assembly aid (16) detachably and removably mounted on the traction drive module (10).

6. The method of assembly of claim 5, wherein the assembly aid (16) comprises:
a first retaining part (90) mounted on the transmission housing (18), and
a second retaining part (92) mounted on the second sprocket (48),
such that the first retaining part (90) and the second retaining part (90, 92) are moveable relative to one another and are fixed in respective positions relative to one another, and the first retaining part (90) or the second retaining part (92) is guided in a guide (102) in the other of the first retaining part (90) or the second retaining part (92).

7. The method of assembly of claim 6, wherein the assembly aid (16) further comprises a drive device (112) for moving the first retaining part (90) and the second retaining part (92).

8. The method of assembly of claim 7, wherein the first retaining part (90) and the second retaining part (92) are moved stepless relative to one another.

9. The method of assembly of claim 7, wherein the drive device (112) is selected from a group consisting of: screw drive, cam drive, eccentric drive and spindle drive.

10. The method of assembly of claim 6, further comprising assembly openings (30) in the transmission housing (18), such that at least two protruding projections (98) of the first retaining part (90) has at least two protruding projections (98) which are inserted into the assembly openings (30) during mounting of the first retaining part (90) on the transmission housing (18),
wherein the assembly openings (30) are arranged and aligned with fixing openings (88) in the second sprocket (48) for fixing the second sprocket (48) on a hub (8) of the drivetrain (2).

11. The method of assembly of claim 10, wherein the assembly openings (30) in the transmission housing (18) are accessible via recesses (94) on the first retaining part (90).

12. The method of assembly of claim 10, wherein the first retaining part (90) further comprises at least one fixing means for fixing the first retaining part (90) in the direction opposite to an insertion direction of the at least two protruding projections (98), the fixing means movable from an insertion position, in which the fixing means is inserted into one of the assembly openings (30), into a fixing position, in which the fixing means engages behind an edge of the assembly openings (30).

13. The method of assembly of claim 12, wherein the fixing means is insertable into same assemble openings (30) as the protruding projections (98).

14. The method of assembly of claim 6, further comprising at least one frontal indentation (76) in the second sprocket (48) and the second retaining part (92) has at least one protruding projection (110) which is inserted into the indentation (76) during mounting of the second retaining part (92) on the second sprocket (48).

15. The method of assembly of claim 14, wherein the frontal indentation (76) is centrally located in the hub (68) of the second sprocket (48).

16. The method of assembly of claim 6, wherein the second retaining part (92) is mounted on the hub (68) of the second sprocket (48).

* * * * *